June 12, 1951 F. M. PRESTWICH 2,556,504
MANUFACTURE FROM PLASTICS OF FLAT ARTICLES OF
LATTICE, LACE, OR LIKE CONFIGURATION
Filed Aug. 6, 1947
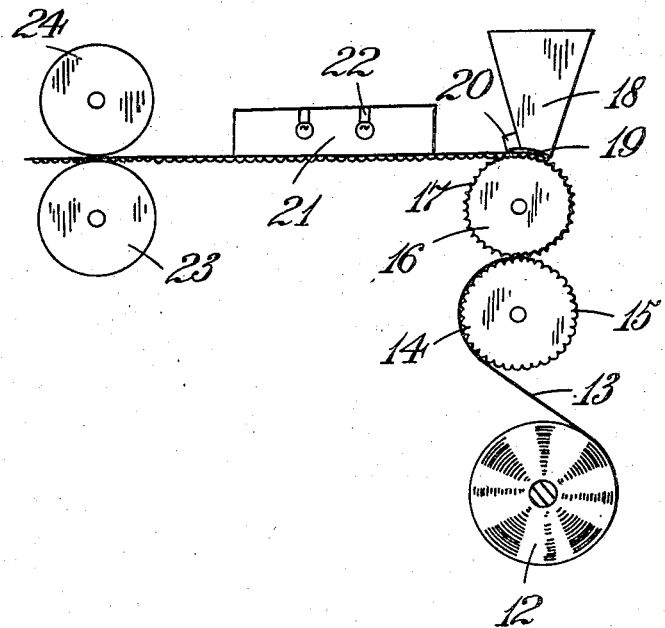
INVENTOR
FRANK PRESTWICH
By: Young, Emery & Thompson Patented June 12, 1951

2,556,504

UNITED STATES PATENT OFFICE 2,556,504

MANUFACTURE FROM PLASTICS OF FLAT ARTICLES OF LATTICE, LACE, OR LIKE CONFIGURATION

Frank Milton Prestwich, London, England

Application August 6, 1947, Serial No. 766,552
In Great Britain April 16, 1945

Section 1, Public Law 690, August 8, 1946
Patent expires April 16, 1965

6 Claims. (Cl. 18—57)

This invention consists in improvements in the manufacture from plastics (such for example as polyvinyl chloride) of flat articles of lattice, lace or like configuration. The term "plastics" in this specification is used to include organic compounds (with additions such as solvents, plasticizers or fillers) which compounds at one stage are liquid or mobile (e. g. in a syrupy or viscous state) but by known processes of polymerisation, condensation or curing, as by heat treatment, are brought into a stable stage as flexible solids. The finished plastics may be polymerised organic compounds such as polyvinyl compounds, polyethylene, polystyrene or polymerised alkyl methacrylate; or they may be artificial resins which can be brought from a mobile state into a flexible solid state such as ureaformaldehyde resins; or they may be cellulose esters or ethers which can be rendered mobile by the use of appropriate solvents; in any case the finished plastics may contain plasticisers, fillers or colouring matter. The expression flat articles in this specification is used to include articles which can be moulded in shallow matrices and can be removed therefrom when completed: a lace-like doyley is typical of such flat articles.

It is characteristic of this invention that the matrix in which the flat articles are moulded and produced is in the form of a web of a material which can take an intaglio impression which acts as a matrix. Such materials are typified by the flong used in steo-printing, and are herein referred to as "paper" which term includes papier-mâché, thin cardboard, thin linoleum, plastic metal foil such as tin-foil and other sheet materials.

This invention consists of a method of manufacturing from plastics flat articles of lattice, lace or like configuration in which (1) a web of paper as above defined is passed through a mechanical device which imparts to one face of the web an intaglio pattern (2) the intaglio face of the web is presented to the discharge outlet of a supply of the mobile plastic so that the depressions in the web are filled with the mobile plastic (3) the said face of the web is scraped as by a doctor scraper to remove excess plastic to the desired extent (4) the web with the mobile plastic in its depressions is passed through a "curing" apparatus such as an oven and (5) the finished flat article is removed from the web. Referring to step (3) it will be understood that the scraper may be adjustable and it may be so arranged as to permit the mobile plastic to form a film over the surface of the web as well as in the depressions so that the finished article is in the form of a film or sheet with the moulded pattern in relief. If however the scraper removes all the plastic from the main surface of the web the finished flat article will be foraminous, i. e. of lattice or lace configuration.

In a preferred method the paper fed from a supply roll passes between two metal rollers one having the desired pattern in relief and the other having the same pattern in intaglio; preferably the paper passes around the relief roll first then through the bite between the two rolls and then continues around the intaglio roll until it arrives at the discharge outlet of a reservoir supplying the plastic in the mobile state. The plastic is fed over the surface of the indented paper and fills the indentations. Some plastic is also applied to the main surface of the paper and this is scraped off by an adjustable doctor scraper which engages the paper immediately it has left the plastic feed. The paper with the plastic in its indentations then passes into an oven. In one arrangement when the paper emerges from the oven the plastic may be already cured and ready for removal from its paper matrix. In another arrangement the curing in the oven is not carried to completion but the exposed surface of the nearly-cured plastic is still somewhat soft or even somewhat tacky. In this second case the paper with the nearly-cured plastic in the indentations may pass through a device where further operations may be carried out: (a) if it be desired that the flat article shall have a fabric backing, the fabric backing may be applied to the nearly-cured plastic by passing the paper and plastic between two rolls, the upper roll being supplied also with the fabric which is to be attached to the plastics: (b) if it be desired to give a suede finish to the surface of the plastic, it may be sprayed with a plain gas blast or with a gas blast containing a fine abrasive powder, and in the case where an abrasive powder is used, the spraying device may be enclosed to prevent escape of the suspended powder.

In the accompanying drawing the supply roll of "paper" 12 supplies the paper web 13 first to the impression roll 14 having the desired pattern in relief as indicated at 15. The corresponding impression roll 16 having the same pattern in intaglio as indicated at 17 is capable of being pressed into contact with the relief roll 14 if desired. The paper 13 passes through the bite between the rolls 14 and 16 and has the pattern impressed upon it. The paper then passes around the intaglio roll 16 until it reaches the plastic feed hopper 18 which has a suitable feed slot 19 directed towards the paper web and it will be seen that the paper web presents the depressions of the pattern to the feed slot 19. By this means the depressions in the paper are filled with the mobile plastic and immediately the paper leaves the plastic feed, it encounters the adjustable doctor scraper 20. This doctor scraper removes the plastic from the main surface of the paper leaving the plastic only in the depressions. The web then passes into the oven 21 which is here shown with electric radiants 22, conveniently infra-red radiants of known form. In the sketch the web is shown as passing between two rollers 23 and 24.

In the case above referred to where a fabric with or without a picture or pattern thereon is to be applied to the plastic, the fabric may be supplied to the roller 24 and it is caused to adhere to the plastic the surface of which is still tacky.

In the case above referred to where the suede finish is to be imparted to the exposed surface of the plastic, the roller 23 may be replaced by a gas blast device which may be enclosed in a hood not shown.

To prevent the plastic adhering to the paper and to permit the ready removal of the finished article from the paper web, the surface of the paper to which the mobile plastic is applied is coated with a resist such as a wax or a varnish or a synthetic resin such as phenol formaldehyde or urea formaldehyde resin.

The finished articles may have a wide variety of uses. Doyleys have already been mentioned and there are many net-like articles which are useful in furnishings and for ornament. The articles may also be used in garments or toys or in certain types of chemical and physical apparatus.

If it be desired to have a powdered metal surface on one side of the finished article, a powder, e. g. a bronze powder or gold powder, may be applied to the paper itself conveniently after the pattern has been impressed thereon but before the plastic is applied thereto. This layer of metal power performs two functions: (a) it replaces the resist and enables the finished article to be removed from the paper web, and (b) it adheres to the surface of the plastic so that the finished article has the metallic ornamentation. Such powdered metal surface might with advantage be applied to the other side of the article (where said article is made of transparent material).

There are two modifications which fall within this invention. In some cases it may be necessary to remove the finished article from the paper, i. e. the paper may form part of the complete product as used. Again, in one example given the finished article is in the form of a sheet with the moulded pattern in relief. By simple means the finished article may be produced with the moulded pattern in intaglio.

Further it will be understood that the flat article (with or without the paper) may, on reheating be suitable for use as a thermoplastic wear-resisting transfer.

I claim:

1. A method of manufacturing flat articles having a pattern formed on at least one surface which comprises continuously subjecting a single web of material, which will take an intaglio pattern and will thereafter retain, of itself, said pattern, in a single pass, successively to the steps of producing an intaglio impression on one face of the web of material between an impressing means and a supporting means, presenting said impressed surface, while supported by said supporting means, to the discharge outlet of a supply of particles of plastic in a mobile state so that the plastic runs into the depressions on the web which are filled thereby, spreading the plastic on the face of the web, while so supported, to remove a desired amount thereof, and removing the web, with the plastic spread thereon, from the support means and delivering the same as a self-supporting pattern to a curing zone for curing the plastic on the web to form a composite sheet from which the web is removable to obtain said flat articles.

2. A method of manufacturing flat articles having a pattern formed on at least one surface which comprises continuously subjecting a single web of material which will take an intaglio pattern and will thereafter retain, of itself, said pattern, in a single pass, successively to the steps of producing an intaglio impression on one face of the web of material between an impressing means and a supporting means, presenting said impressed surface, while supported by said means, to the discharge outlet of a supply of particles of plastic in a mobile state so that the plastic runs into the depressions on the web which are filled thereby, spreading the plastic on the face of the web, while so supported, to form a continuous film of plastic over the surface of the web and the depressions therein, and removing the web, with the plastic spread thereon, from the support means and delivering the same as a self-supporting pattern to a curing zone for curing the plastic on the web to form a composite sheet from which the web is removable to obtain said flat articles.

3. A method of manufacturing flat articles having a pattern formed on at least one surface which comprises continuously subjecting a single web of material, which will take an intaglio pattern and will thereafter retain, of itself, said pattern, in a single pass, successively to the steps of producing an intaglio impression on one face of the web of material between an impressing means and a supporting means, presenting said impressed surface, while supported by said means, to the discharge outlet of a supply of particles of plastic in a mobile state so that the plastic runs into the depressions on the web which are filled thereby, spreading the plastic on the face of the web, while so supported, to remove the plastic therefrom except in the depressions of the web, and removing the web, with the plastic spread thereon, from the support means and delivering the same as a self-supporting pattern to a curing zone for curing the plastic on the web to form a composite sheet from which the web is removable to obtain said flat articles.

4. A method of manufacturing flat articles having a pattern formed on at least one surface which comprises withdrawing a single web of paper, which will take an intaglio pattern and will thereafter retain, of itself, said pattern, from a roll and continuously subjecting, in a single pass, the paper to pressing between a pair of rollers, one having said pattern, presenting said impressed surface, while supported by one of said rollers, to the discharge outlet of a supply of mobile plastic so that the plastic runs into the depressions on the web which are filled thereby, spreading the plastic on the face of the web, while so supported, to remove a desired amount thereof, and removing the web, with the plastic spread thereon, from the support means and delivering the same as a self-supporting pattern to a curing zone for curing the plastic on the web to form a composite sheet from which the web is removable to obtain said flat articles.

5. A method of manufacturing flat articles having a pattern formed on at least one surface which comprises continuously subjecting a single web of material, which will take an intaglio pattern and will thereafter retain, of itself, said pattern, in a single pass, successively to the steps of producing an intaglio impression on one face of the web between an impressing means and a supporting means, presenting said impressed surface, while supported by said means, to the discharge outlet of a supply of particles of plastic in a mobile state so that the plastic runs into the depressions on the web which are filled thereby, spreading the plastic on the face of the web, while so supported, to remove a desired amount thereof, removing the web, with the plastic spread thereon, from the support means and delivering the same as a self-supporting pattern to a curing zone for curing the plastic on the web, partly curing the plastic, and applying a fabric backing to the plastic.

6. A method of preparing from plastic flat articles having a pattern formed on at least one surface, comprising continuously passing a web of material which will take an intaglio pattern and will thereafter retain, of itself, said pattern in a single pass over a supporting surface having an intaglio impression therein, pressing the web into the intaglio impression of the supporting surface, depositing particles of plastic in a mobile state on the web while the web is on said supporting surface so that the plastic will run into and fill the intaglio impressions of the web, spreading the plastic on the face of the web while supported on the supporting surface to remove a desired amount of plastic, removing the web, with the plastic spread thereon, from the support means and delivering the same as a self-supporting pattern to a curing zone for curing the plastic on the web to form a composite sheet from which the web is removable to obtain said flat articles and removing the plastic article from the web.

FRANK MILTON PRESTWICH.

REFERENCES CITED

The following references are of record in the file of this patent:

UNITED STATES PATENTS

| Number | Name | Date |
|---|---|---|
| 986,162 | Gare | Mar. 7, 1911 |
| 1,454,323 | MacInnes | May 8, 1923 |
| 1,813,587 | Sindler | July 7, 1931 |
| 1,876,432 | Phillips | Sept. 6, 1932 |
| 1,918,937 | Shelton | July 18, 1933 |
| 2,271,058 | Binns | Jan. 27, 1942 |